United States Patent Office 3,141,007
Patented July 14, 1964

3,141,007
MODIFIED POLYESTER RESINS
Jacobus Rinse, Bernardsville, N.J., assignor to Agrashell, Incorporated, Los Angeles, Calif., a corporation of Delaware
No Drawing. Filed Aug. 18, 1960, Ser. No. 50,303
Claims priority, application Netherlands Dec. 19, 1955
17 Claims. (Cl. 260—78.5)

This invention relates to novel modified polyester resins and their production.

Thermosetting modified polyester resins are known. For instance, upon the addition of catalyst, as a rule a peroxide, to a solution of an unsaturated ester in a highly reactive monomer, polymerization sets in. Actually, the monomer, in practice usually styrene, co-polymerizes with the unsaturated ester, resulting in the formation of hard resins. These resins find wide industrial applications. However, such resins, typified by styrene-polyester resins, have the disadvantage of remaining tacky for a considerable time.

It is an important object of this invention to provide novel resins which dry rapidly upon exposure to air and have other advantageous properties.

Other objects and advantages of the invention will become apparent from the more detailed description which follows.

In accordance with this invention, new and improved resins are obtained by reacting an aluminum alkoxide or an aluminum phenoxide, a polybasic acid anhydride and a polymerizable reactive monomer. The resins are advantageously formed by dispersing an aluminum alkoxide or phenoxide and the dibasic acid in a liquid reactive monomer and causing the mixture to react. A catalyst may be used but is not always necessary. At times, however, it is preferred to use a catalyst especially to speed up the hardening process. Catalysts may be used such as those heretofore used in the production of reactive monomer modified polyester resins. As a rule, peroxides, such as benzoyl peroxide, are used. Apparently the reaction of aluminum alkoxides or phenoxides with dicarboxylic anhydrides promotes the polymerization of the monomer thereby, at times, making the use of peroxide or other catalysts unnecessary.

The aluminum alkoxides used in this invention are of a type known in the art. Both lower and higher aluminum alkoxides may be used. Suitable aluminum alkoxides are, for example, aluminum ethoxide, aluminum isopropoxide, aluminum butoxide, aluminum amyloxide, aluminum allyloxide, and higher aluminum alkoxides such as aluminum-stearyl oxide and -oleyl oxide. Aluminum alkoxides may be used in the solid or the liquid state, although the liquid state is preferred. Examples of liquid aluminum alkoxides include super-cooled molten aluminum isopropoxide and liquid aluminum isobutoxide. The lower molecular aluminum oxides, say, those containing up to 8 carbon atoms in the alkoxide group, show greater reactivity and are generally preferred. Aluminum isopropoxide is easily made and conveniently handled, and therefore is a preferred aluminum compound. Mixed aluminum alkoxides, such as di-isopropoxy aluminum amyloxide may be used also. Suitable aluminum phenoxides include both the substituted and unsubstituted phenoxides, such as aluminum triphenolate, aluminum tricresylate. It will be understood, of course, that both the alkoxide and phenoxide radicals may be substituted with hydrocarbon and other non-functional groups.

From the standpoint of stability and control of reaction, cyclic oxy-aluminum alkoxide and phenoxide trimers derivable from the above mentioned aluminum compounds are preferred. The compounds are disclosed in applicant's copending applications Serial No. 639,638, filed February 12, 1957, and Serial No. 706,902, filed January 3, 1958.

Generally speaking, the aluminum alkoxides and aluminum phenoxides of this invention may be represented by the formula

and their polymers by the formula

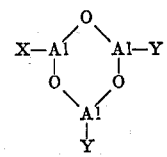

wherein X, Y and Z are alkoxy or phenoxy groups.

Suitable dicarboxylic acid anhydrides include both saturated and unsaturated dibasic carboxylic acids. Examples of such acid anhydrides are maleic acid anhydride, phthalic anhydride, dodecyl succinic anhydride, tetra- and hexahydrophthalic acid anhydride, and like known dibasic acid anhydrides. The dibasic acid anhydrides are preferably chosen so that they are soluble in the polymerizable monomer at the desired concentration. Also, suspensions of solid ground anhydrides may be used, since such suspensions normally dissolve in the monomer when the mixture becomes warm. It is not necessary to use a single dicarboxylic acid anhydride, since mixtures thereof may be used. In order to facilitate mixing and reacting, the low melting dicarboxylic acid anhydrides are preferred.

Maleic anhydride is highly reactive when mixed with the highly reactive aluminum alkoxides, and, as a result, dark colored solids are frequently formed. On this account mixtures of maleic anhydrides with other dicarboxylic acid anhydrides usually are preferred.

The suitable reactive monomers are of the type heretofore used in the production of modified polyester resins, these monomeric compounds being described by examples and referred to broadly as "unsaturated copolymerizable monomers" in the text entitled Polyesters and Their Applications by Bjorksten Research Lab. Inc., Reinhold Pub. Co., New York, 1956. More particularly, various vinyl monomers (including vinylidene monomers) are preferred, including styrene, vinyl toluene, vinyl acetate, methyl methacrylate, ethylene, etc. The monomers should be sufficiently reactive to form polymers at temperatures that are not too high. Advantageously they should react at room temperature or slightly elevated temperatures, and preferably below 100° C. If necessary, pressure may be used, but should be avoided if possible. When liquid monomers are used superatmospheric pressure usually is superfluous.

Apparently in accordance with this invention there is an addition reaction between the aluminum alkoxide or the phenoxide, and the dicarboxylic acid anhydride which can be assumed to take place according to the following formula:

In this manner, depending upon the molar ratio of the aluminum alkoxide or phenoxide to the acid anhydride, 1–3 alkoxy or phenoxy groups can be replaced with 1–3 acyloxy groups. This reaction, which is exothermic, speeds up the polymerization of the monomer, probably due to a catalytic effect imparted by the aluminum atoms during the change of alkoxy for acyloxy groups.

By varying the molar ratios of the three reactants, products having widely different properties can be obtained. For example, new products can be produced which set rapidly and dry upon exposure to the air.

The ratio of the monomer to the other components can be varied within wide limits. Where it is desirable to avoid excessive shrinkage in the formation of the polymer, as in molding processes, the quantity of the monomer should be kept as low as possible, i.e., 20–30% by weight of the total mixture. For specific purposes, for example, for coating compositions, the quantity of monomer may be even lower or considerably higher than the 20–30%, i.e., as little as 10% or in a predominating amount as high as about 90%.

It is possible to incorporate thickening agents, resins, pigments, and dyes in the mixtures hereof.

As pointed out above, many of the new resins of this invention set rapidly upon exposure to the air. However, the drying times can be adjusted markedly by varying the proportions of the reactants. The inflammability of the resins of this invention is lower than that of polyester resins such as discussed above due to the aluminum bridges which seem to build into the polymer.

In accordance with this invention, it is possible to prepare varnishes, paints and like coating materials containing no solvent. These coating materials, as previously pointed out, dry through hydrolysis and thereby form a skin. In this way, the evaporation of any unreacted monomer is inhibited or prevented and, as a result, the reaction mass can polymerize more thoroughly.

In accordance with a special procedure the acid anhydride is added to the monomer and then the aluminum alkoxide is added to the mixture either as a fine powder or the liquid or as a solution of the monomer. It is also possible to make a powdered mixture of a dicarboxylic anhydride and an aluminum alkoxide or phenoxide and add this mixture to the monomer. When the anhydride is a liquid, such as dodecyl succinic anhydride, the anhydride may be added to a solution of the aluminum alkoxide or phenoxide in a monomer. Customarily, the components of the mixture are thoroughly mixed and, after a few minutes, the temperature of the mixture begins to rise and any undissolved substances begin to dissolve. The viscosity increases. Before the mixture solidifies, if molded products are desired, it may be poured into molds and thereafter used in a known manner for other applications.

Also, the reaction of the acid anhydride with aluminum alkoxide or phenoxide can be effected in a polyester solution. This solution should then be free from carboxyl and hydroxyl groups, in order to avoid a reaction with the aluminum alkoxides or phenoxides. The effect of the aluminum triacylate formed in the process naturally depends on its concentration in the polyester solution. The formation of only small amounts of triacylate, e.g., of 5–10%, reduces the tackiness of the ultimately obtained product to a considerable extent.

The invention is illustrated further by the following examples:

Example 1

A finely ground mixture of 204 g. of aluminum isopropoxide and 294 g. of maleic anhydride is added to 300 g. of methyl methacrylate. After some time, as a rule 5–20 minutes, the mass automatically becomes warm, thickens, and sets to a viscous polymer.

Example 2

To a solution of 196 g. of maleic anhydride in 400 g. of vinyl toluene 204 g. of liquid aluminum isopropoxide are added. The mixture automatically becomes warm and gradually sets. A hard, brown polymer is obtained.

Example 3

Two hundred forty-six (246) g. of liquid aluminum isobutoxide are added to a solution of 250 g. of maleic anhydride in 250 g. of a styrene. An exothermic reaction takes place, as a result of which a hard, yellowish red-brown, plastic mass is obtained.

Example 4

Seven and four tenths (7.4) g. of finely powdered phthalic anhydride and 9.8 of finely powdered maleic anhydride are added to 10 g. of styrene. After addition of 11 g. of di-isopropoxy aluminum butoxide the mass gradually becomes warm and more viscous. With a view to the complete hardening, the viscous reaction mass is poured into an aluminum mold.

Example 5

Twenty (20) g. of dodecyl succinic anhydride, a trace of benzoyl peroxide, and 11 g. of liquid aluminum isopropoxide are added to 10 g. of styrene. The mixture automatically becomes warm and gradually sets to a soft, rubbery mass.

Example 6

Twenty (20) g. of styrene are mixed with 5 g. of maleic anhydride and with a trace of methyl ethyl ketone peroxide, upon which, 5 g. of isobutoxy aluminum di-isopropoxide are added. The mixture becomes warm and viscous. When this liquid is exposed in a thin layer to the air, it rapidly dries to a hard, tough coating.

Example 7

A mixture of 204 g. of isopropoxide and 462 g. of hexahydrophthalic anhydride is added to 400 g. of styrene. After a short time the mixture becomes warm and more viscous. Finally it sets completely.

Example 8

One hundred seventy-four (174) g. of aluminum tricresylate are dissolved in 200 g. of styrene and the solution is mixed with a suspension of 146 g. of maleic anhydride in 50 g. of styrene. As soon as all the components have been thoroughly mixed, the reaction sets in and the mixture polymerizes to a markely brown-colored, solid material.

Example 9

Eight (8) parts of maleic anhydride are dissolved in 100 parts of styrene and heated to 50° C. Sixteen (16) parts of a 50% solution of di-isopropoxy aluminum sec. butoxide in styrene are added to the resulting solution. Reaction sets in at once and a highly viscous white polymer is obtained.

In the foregoing examples, the aluminum R-oxy compounds can be replaced with the corresponding cyclic oxy-aluminum R-oxides in equivalent amounts.

It will be observed that the resins hereof apparently bear a certain resemblance to the thermosetting polyester resins of the prior art which are cured in the final stage with a reactive monomer. However, as explained herein, the ester forming reactants are different, especially in regard to the aluminum compound, and the esters are of a quite different nature and apparently are formed in situ. Undoubtedly, also, the presence of the aluminum atoms affects the nature of the reaction taking place with the reactive monomers.

This application is a continuation-in-part of my co-pending application Serial No. 629,243, filed December 19, 1956, now abandoned.

It will be understood that the present invention is not limited to the specific details disclosed herein for illustrative purposes. Details as to procedures, reactants, and proportions thereof, processing conditions and the like, will readily occur to those skilled in the art without departing from the scope or spirit of the invention which the claims appended hereto are intended to define.

I claim:

1. A process for producing a resin which comprises forming a mixture of 10–90 percent by weight of a monovinylic monomer and, dispersed therein, 90–10 percent by weight of additional components (a) an aluminum compound of the formula selected from the group

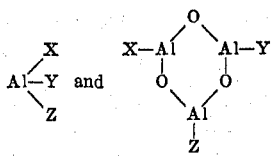

where X, Y, and Z are selected from the group consisting of alkoxy and phenoxy, and (b) a hydrocarbon dicarboxylic acid anhydride, the molar ratio of component (b) to component (a) in the mixture being between 1:1 and 3:1, at a temperature between about room temperature and about 100° C. and at a pressure at which said monomer is liquid, whereby the components of the mixture react to form said resin.

2. A process as in claim 1 wherein a peroxide catalyst is additionally present in said mixture.

3. A resin produced by forming a mixture of 10–90 percent by weight of a monovinylic monomer and, dispersed therein, 90–10 percent by weight of additional components (a) an aluminum compound of the formula selected from the group

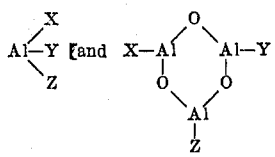

where X, Y, and Z are selected from the group consisting of alkoxy and phenoxy, and (b) a hydrocarbon dicarboxylic acid anhydride, the molar ratio of component (b) to component (a) in the mixture being between 1:1 and 3:1, at a temperature between about room temperature and about 100° C. and at a pressure at which said monomer is liquid.

4. A resin produced by forming a mixture of 20–90 percent by weight of a monovinylic monomer and, dispersed therein, 80–10 percent by weight of additional components (a) an aluminum compound of the formula selected from the group

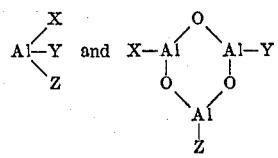

where X, Y, and Z are selected from the group consisting of alkoxy and phenoxy, and (b) a hydrocarbon dicarboxylic acid anhydride, the molar ratio of component (b) to component (a) in the mixture being between 1:1 and 3:1, at a temperature between about room temperature and about 100° C. and at a pressure at which said monomer is liquid.

5. A resin produced by forming a mixture of 10–90 percent by weight of a monovinylic monomer and, dispersed therein, 90–10 percent by weight of additional components (a) an aluminum compound of the formula selected from the group

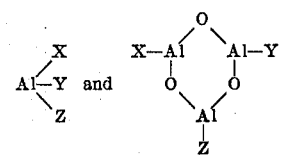

where X, Y, and Z are selected from the group consisting of alkoxy and phenoxy, and (b) an unsaturated hydrocarbon dicarboxylic acid anhydride, the molar ratio of component (b) to component (a) in the mixture being between 1:1 and 3:1, at a temperature between about room temperature and about 100° C. and at a pressure at which said monomer is liquid.

6. A resin produced by forming a mixture of 10–90 percent by weight of a monovinylic monomer and, dispersed therein, 90–10 percent by weight of additional components (a) an aluminum alkoxide having not more than 8 carbon atoms in the alkyl group, and (b) a hydrocarbon dicarboxylic acid anhydride, the molar ratio of component (b) to component (a) in the mixture being between 1:1 and 3:1, at a temperature between about room temperature and about 100° C. and at a pressure at which said monomer is liquid.

7. A resin produced by forming a mixture of 10–90 percent by weight of a monovinylic monomer and, dispersed therein, 90–10 percent by weight of additional components (a) an aluminum phenoxide, and (b) a hydrocarbon dicarboxylic acid anhydride, the molar ratio of component (b) to component (a) in the mixture being between 1:1 and 3:1, at a temperature between about room temperature and about 100° C. and at a pressure at which said monomer is liquid.

8. A resin produced by forming a mixture of 10–90 percent by weight of a monovinylic monomer and, dispersed therein, 90–10 percent by weight of additional components (a) a cyclic oxyl-aluminum alkoxide trimer, and (b) a hydrocarbon dicarboxylic acid anhydride, the molar ratio of component (b) to component (a) in the mixture being between 1:1 and 3:1, at a temperature between about room temperature and about 100° C. and at a pressure at which said monomer is liquid.

9. A resin produced by forming a mixture of 20–90 percent by weight of methyl methacrylate and, dispersed therein, 80–10 percent by weight of additional components (a) aluminum isopropoxide and (b) maleic acid anhydride, the molar ratio of component (b) to component (a) being between 1:1 and 3:1, at a temperature between about room temperature and about 100° C.

10. A resin produced by forming a mixture of 20–90 percent by weight of styrene and, dispersed therein, 80–10 percent by weight of additional components (a) aluminum isobutoxide and (b) maleic acid anhydride, the molar ratio of component (b) to component (a) being between 1:1 and 3:1, at a temperature between about room temperature and about 100° C.

11. A resin produced by forming a mixture of 20–90 percent by weight of styrene and, dispersed therein, 80–10 percent by weight of additional components (a) di-isopropoxy aluminum butoxide and (b) phthalic acid anhydride, the molar ratio of component (b) to component (a) being between 1:1 and 3:1, at a temperature between about room temperature and about 100° C.

12. A resin produced by forming a mixture of 20–90 percent by weight of styrene and, dispersed therein, 80–10 percent by weight of additional components (a) di-isopropoxy aluminum isobutoxide and (b) maleic acid anhydride, the molar ratio of component (b) to component (a) being between 1:1 and 3:1, at a temperature between about room temperature and about 100° C.

13. A resin produced by forming a mixture of 20–90 percent by weight of styrene and, dispersed therein, 80–10 percent by weight of additional components (a) di-isopropoxy aluminum sec.-butoxide and (b) maleic acid anhydride, the molar ratio of component (b) to component (a) being between 1:1 and 3:1, at a temperature between about room temperature and about 100° C.

14. A resin produced by forming a mixture of 20–90 percent by weight of vinyl toluene and, dispersed therein, 80–10 percent by weight of additional components (a) aluminum isopropoxide and (b) maleic anhydride, the molar ratio of component (b) to component (a) being between 1:1 and 3:1, at a temperature between about room temperature and about 100° C.

15. A resin produced by forming a mixture of 20–90 percent by weight of styrene and, dispersed therein, 80–10 percent by weight of additional components (a) aluminum isopropoxide and (b) dodecyl succinic anhydride, the molar ratio of component (b) to component (a) being between 1:1 and 3:1, at a temperature between about room temperature and about 100° C.

16. A resin produced by forming a mixture of 20–90 percent by weight of styrene and, dispersed therein, 80–10 percent by weight of additional components (a) aluminum isopropoxide and (b) hexahydrophthalic anhydride, the molar ratio of component (b) to component (a) being between 1:1 and 3:1, at a temperature between about room temperature and about 100° C.

17. A resin produced by forming a mixture of 20–90 percent by weight of styrene and, dispersed therein, 80–10 percent by weight of additional components (a) aluminum tricresylate and (b) maleic acid anhydride, the molar ratio of component (b) to component (a) being between 1:1 and 3:1, at a temperature between about room temperature and about 100° C.

References Cited in the file of this patent

UNITED STATES PATENTS

| 2,726,230 | Carlson | Dec. 6, 1955 |
| 2,844,551 | Orthner | July 22, 1958 |
| 2,849,426 | Miller | Aug. 26, 1958 |
| 2,870,128 | Sellers | Jan. 20, 1959 |
| 2,873,263 | Lal | Feb. 10, 1959 |

FOREIGN PATENTS

| 734,675 | Great Britain | Aug. 3, 1955 |